United States Patent
Waterson (10) Patent No.: US 7,779,062 B2
(45) Date of Patent: Aug. 17, 2010

(54) SYSTEM FOR PREVENTING KEYSTROKE LOGGING SOFTWARE FROM ACCESSING OR IDENTIFYING KEYSTROKES

(75) Inventor: David Lynch Waterson, Auckland (NZ)

(73) Assignee: Ripple Effects Holdings Limited, Auckland (NZ)

( * ) Notice: Subject to any disclaimer, the term of this patent is extended or adjusted under 35 U.S.C. 154(b) by 1212 days.

(21) Appl. No.: 11/311,133

(22) Filed: Dec. 20, 2005

(65) Prior Publication Data

US 2006/0101128 A1 May 11, 2006

Related U.S. Application Data

(63) Continuation-in-part of application No. 10/920,268, filed on Aug. 18, 2004, now abandoned.

(30) Foreign Application Priority Data

Dec. 20, 2004 (NZ) ..................... 537327

(51) Int. Cl.
G06F 15/16 (2006.01)
G06F 12/14 (2006.01)

(52) U.S. Cl. .......... 709/200; 709/250; 726/22; 726/26

(58) Field of Classification Search .......... None
See application file for complete search history.

(56) References Cited

U.S. PATENT DOCUMENTS

| | | | | |
|---|---|---|---|---|
| 5,596,718 A * | 1/1997 | Boebert et al. | ........ | 726/16 |
| 5,748,888 A * | 5/1998 | Angelo et al. | ........ | 726/26 |
| 6,321,267 B1 | 11/2001 | Donaldson | ........ | 709/229 |
| 6,366,950 B1 | 4/2002 | Scheussler et al. | ........ | 709/206 |
| 7,263,721 B2 * | 8/2007 | Kelley et al. | ........ | 726/23 |
| 7,328,457 B1 * | 2/2008 | Mister | ........ | 726/30 |
| 2004/0215971 A1 * | 10/2004 | Nam | ........ | 713/200 |
| 2005/0144451 A1 * | 6/2005 | Voice et al. | ........ | 713/170 |
| 2005/0262555 A1 * | 11/2005 | Waterland | ........ | 726/21 |
| 2006/0036731 A1 * | 2/2006 | Mossman et al. | ........ | 709/225 |

FOREIGN PATENT DOCUMENTS

DE 19803339 A1 8/1999
DE 10029643 A1 12/2001

OTHER PUBLICATIONS

Maziers et al, $5^{TH}$ ACM Conf on Computer & Commun Security, Nov. 1998, pp. 27-36, The design, implementation and operation of an . . . .

Needham et al, Network Attack and Defence, Chapter 18, pp. 367-381, Feb. 20, 2001.

Krasavin, Keyloggers-Content Monitoring Exploits, 7 pgs., Feb. 11, 2002.

Schultz et al., Proc IEEE Symposium, May 2001, pp. 38-49, Data mining methods for detection of new malicious executables.

* cited by examiner

*Primary Examiner*—John B. Walsh
(74) *Attorney, Agent, or Firm*—Jacobson Holman PLLC (57) ABSTRACT

A method and system is provided for securing user entry data against keyboard login attempts. The method/system masks user input data, either insulating the data from vulnerable parts of the operating system or application, or contaminating user data that is supplied to those vulnerable parts of the operating system or application. The method/system securely stores data, either intercepted prior to reaching the vulnerable parts of the operating system or extracted from the contaminated data, and securely provides the data directly to a verified application.

21 Claims, 6 Drawing Sheets

SYSTEM FOR PREVENTING KEYSTROKE LOGGING SOFTWARE FROM ACCESSING OR IDENTIFYING KEYSTROKES

This is a continuation-in-part of U.S. Ser. No. 10/920,268 filed Aug. 18, 2004 now abandoned.

FIELD OF THE INVENTION

The field of the invention generally relates to a system and/or software that can prevent keystroke logging software from accessing or identifying keystrokes and mouse clicks entered by a user on a computer system or any electronic device requiring user input.

SUMMARY OF THE PRIOR ART

Keystroke logging software programs constitute a danger to computer users in that they record and can then store sensitive information for later retrieval or send a user's sensitive data to unauthorised parties. Examples of sensitive data that, computer users enter from time to time but do not want stored or distributed to unauthorised parties include: bank account numbers, credit card numbers, passwords, logon details, web sites viewed, sensitive personal information, sensitive organisational information or sensitive State information. Keystroke logging software can be an invasion of privacy and a threat to security. Keystroke logging software can easily be spread as attachments to emails or inadvertently downloaded from the internet and thus present a significant threat to computer users. Keystroke logging software can be configured to self-install in stealth and remain undetected on a user's computer, monitoring keystrokes entered into the keyboard without the knowledge of the user.

Keystroke logging software is also known as keystroke sniffing software, keyboard sniffing software, keystroke loggers, mouse click logging. This document will refer to all these types of software as keystroke logging software or keystroke loggers. Keystroke logging software forms part of the wider group of computer applications known as spyware.

Conventional methods of combating keystroke logging software include anti-spyware software that detects the existence of keystroke loggers by searching for files that match a database of signatures of known spyware. A problem with conventional anti-spyware of this nature is that they rely on the anti-spyware company quickly identifying new spy ware, developing the signature, and the computer user regularly downloading the database of known signatures. Another method of thwarting keystroke loggers is to use onscreen simulated keypads. It is possible for spyware to circumvent this technique however, and users find the process unfriendly. Even if the onscreen keypad appears at a random position on the screen, it is still possible for spyware to detect the characters entered by monitoring mouse button clicks and comparing their position relative to the position of the onscreen keypad.

Another method used by anti-keystroke logging software is to monitor software running at the kernel level, and to deactivate any suspected keystroke loggers. This method has a number of dangers inherent in deactivating, unassociated applications, including the risk of permanently damaging files required for the computer's operating system. Other anti-key logging approaches involve hardware devices such as smart cards or identity confirmation devices. These are expensive, difficult to deploy and are unfriendly to the user.

It is possible to develop keystroke loggers that monitor the event of a key press (a key-down event). It is also possible for keystroke loggers to harvest keystroke entries directly from the data-entry window of an application. It is also possible to monitor the keyboard driver to solicit key strokes.

SUMMARY OF THE INVENTION

It is an object of the present invention to provide a system for overcoming the above-mentioned difficulties by preventing keystroke logging software from accessing and/or identifying keystroke entries.

In a first aspect the present invention consists in a computer program for securing user entry data, said program executing the steps:
  masking user input data,
  receiving a request for user input data,
  identifying a valid requesting application in said request, and
  returning unmasked user input data to an identified valid requesting application.

According to a further aspect of the present invention, at the time of initialisation the computer program executes the steps of:
  receiving a request for a token from an application, and
  returning a unique token to said application in response to said request; and
  said program identifies a valid requesting application in a said request for user input data on the basis of the request exhibiting proof of possession of said unique token by said application.

According to a further aspect of the present invention, at said time of initialisation said program includes the step of switching to a disabled mode, wherein a warning is presented to the user and all subsequent input to the field is ignored, if a second token is requested.

According to a further aspect of the present invention, wherein said step of masking user input data includes:
  determining that a protected field has focus for user data entry; and, while said field has focus,
  streaming randomly generated pseudo-entry data to contaminate or replace the user entry data.

According to a further aspect of the present invention, said program extracts unmasked data by comparing contaminated data with the pseudo-entry data to extract the difference as said unmasked user input.

According to a further aspect of the present invention, said step of masking user input data comprises the steps; determining that an entry field subject to protection has focus for user data entry; while said field has focus collecting said user entry data and storing the user entry data without sending the user entry data to the keyboard buffer.

According to a further aspect of the present invention, said program encrypts said stored user entry data.

According to a further aspect of the present invention, said program sends said keyboard buffer a string of randomly generated pseudo-entry characters in place of said user input data.

According to a further aspect of the present invention, said program operates under the Microsoft WINDOWS operating system, or an equivalent operating system, and said program inserts itself as a keyboard driver having highest priority in said system, at least for the duration that a protected entry field has focus.

According to a further aspect of the present invention, said program periodically checks that it still has the highest priority for the duration that the protected entry field has focus.

According to a further aspect of the present invention, said program, when initiated, disables active window hooks.

According to a further aspect of the present invention, said program modifies WINDOWS functions for returning data from a window, to return random fake data in relation to protected fields.

In a second aspect the present invention consists in the steps: determining that an entry field subject to protection has focus for user data entry; while said field has focus collecting said user entry data and storing the user entry data without sending the user entry data to the keyboard buffer.

According to a further aspect of the present invention, said program encrypts said stored user entry data.

According to a further aspect of the present invention, said program sends said keyboard buffer a string of randomly generated pseudo-entry characters in place of said user input data.

In a still further aspect the present invention consists in a computer program for securing user entry data, said program executing the steps: determining that an entry field subject to protection has focus for user data entry; while said field has focus masking user entry by streaming randomly generated pseudo-entry data to contaminate the user entry data, and, as necessary, extracting user entry data from said contaminated data by comparing the contaminated data with said randomly generated pseudo-entry data to extract the difference as said unmasked user input.

According to a further aspect of the present invention wherein said step of randomly generated pseudo-entry data comprises intermittently generating random keystroke data.

In a still further aspect the present invention consists in a system for preventing keyboard sniffer programs from intercepting input via a keyboard comprising:

means for adding randomly generated characters into the keyboard buffer between password keystrokes; and means for reading said keyboard buffer; and means for reading the stream of said randomly generated characters and removing said randomly generated characters.

In a still further aspect the present invention consists in a method of preventing keyboard sniffer programs from intercepting input via a keyboard including the steps of:

adding randomly generated characters into the keyboard buffer between password keystrokes; and reading said keyboard buffer; and reading the stream of said randomly generated characters and removing said randomly generated characters.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

DETAILED DESCRIPTION OF THE PRESENT INVENTION

Conventional spyware attempts to prevent keystroke logging software from harvesting keystrokes entered by the user by searching for the existence of known keyloggers on the user's system.

In contrast, one improvement offered by the present invention prevents key stroke loggers from logging sensitive information from the keyboard buffer by obscuring the sensitive data with random data for direct access by the underlying application in secure memory and supplies random replacement data to password fields in the data entry window.

Another improvement offered by the present invention prevents key stroke loggers from harvesting keystrokes from the keyboard driver by placing a filter on the output of the keyboard driver that replaces actual keystrokes with fake, randomly-generated characters.

Another improvement offered by the present invention prevents key stroke loggers from harvesting keystrokes from the data entry window by replacing actual keystrokes with fake, randomly-generated characters.

Generally each data entry field of a data entry window is a program performing certain standard functions while the entry field has focus. For example the data entry field may display the characters entered in the entry field or may display an indication that characters have been entered without displaying the characters themselves, for example by displaying a series of asterisks. The data entry field computer code also controls the behaviour of the data entry field. For example the data entry field may include pull down lists or election lists or similar. Once it no longer has focus the data entry field will eventually return entered data to the data entry window program that it is associated with. The data entry window program that then passes the information to the underlying application which requires the information and which initialised the data entry window.

One preferred form of the present invention is a modified data entry field exhibiting some altered behaviours that resist keystroke logging attempts that can occur within the various implementation levels of a computer based system. The various implementation levels are typically known as the kernel, shell and application levels.

Another form of the invention does not require a modified data entry field. Instead the program detects and then protects passwords on password-fields, and other data on all other entry fields.

Figure 6:
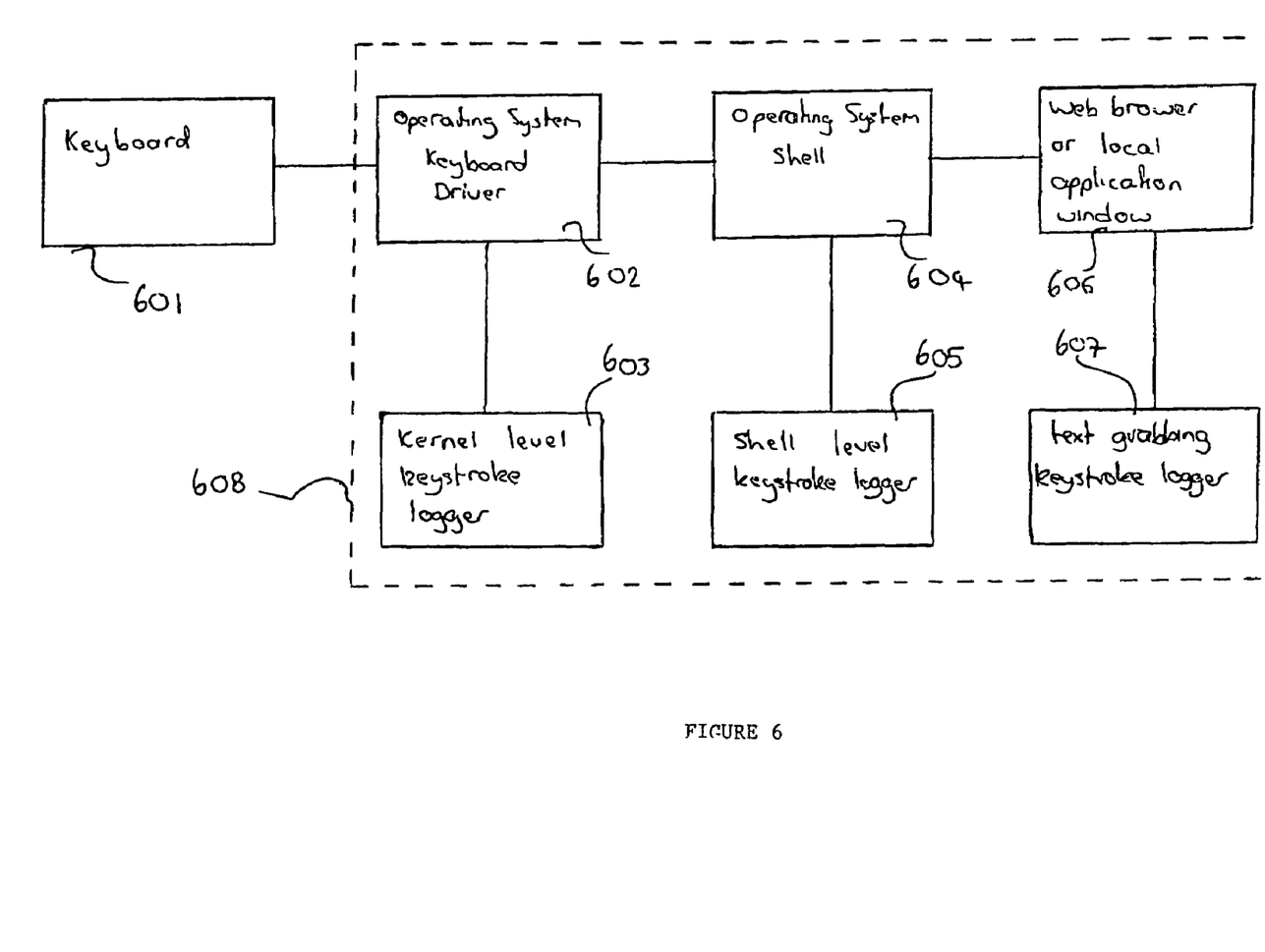
FIG. 6 is a diagrammatic representation of the different software levels at which keystroke loggers may operate.

FIG. 6 illustrates the various operating system levels where keystroke logging software is known to attack in a typical present day personal computer system. The user will enter sensitive information on a keyboard (or key-entry device) 601 which is connected to a computer (or other hardware) 608. The operating system of the computer will have a keyboard driver and buffer 602 that interfaces between the hardware computer keyboard and any software. A kernel level keystroke logging program 603 will harvest keystroke information directly from the keyboard driver.

Shell level software 604 typically interfaces between the keyboard driver of the operating system and other higher level software applications. Shell level software typically accesses the operating system keyboard buffer to acquire keystroke information. Shell level keystroke logging software 605 may harvest information straight from the operating system keyboard buffer.

Application level keystroke logging software 607 may further harvest keystroke information directly from an application 606. Applications are typically used to display the information to the user via a graphical user interface.

The program according to a first aspect of the present invention is intended to defeat keystroke loggers that attempt to harvest keystroke information at a kernel level.

The program according to a second aspect of the present invention is intended to defeat keystroke loggers that attempt to harvest keystroke information at a shell level.

The program according to a third aspect of the present invention is intended to defeat keystroke loggers that attempt to harvest keystroke information through text grabbing at an application level.

The purpose of the present invention is to prevent or minimise keystroke logging by overcoming the various methods used to obtain the keystroke information, or as many of these methods as possible.

Some keystroke loggers attempt to harvest keystrokes through modification or replacement of the operating system keyboard driver. The keyboard driver is a kernel level computer program designed to interface between the computer keyboard and operating system keyboard buffer. The operating system keyboard buffer acts as temporary storage for the keystroke information before passing it on to applications that require the keystroke information as directed by the operating system. When a user enters characters from the keyboard the keyboard driver ensures that data representing these keystrokes enter the keyboard buffer.

A keystroke logger may overwrite the standard keyboard driver with a malicious version. The new version gives the keystroke logger the capability of directly harvesting keystroke information before that data reaches the keyboard buffer. An existing keyboard driver could also be modified to copy keystroke information to keystroke logging software. A keystroke logger may alternatively insert a filter on the output of the keyboard driver to harvest keystrokes. The filter forwards information from the keyboard driver to the keystroke logger. A keystroke logger either stores the keystrokes for later retrieval in a file on the system, or is configured to send the file over a communications network to a location outside the system.

The software according to one aspect of the present invention acts as a driver filter to the keyboard driver. The software interfaces directly with operating system keyboard driver to protect all incoming keystroke information. The protection is formed by filtering out the real keystrokes and replacing them with fake, randomly-generated keystrokes. The software then interacts directly between the keyboard driver and any other software. In this way, the software has the ability to control the release of keystroke information.

Upon activation the software performs two operating system keyboard driver integrity checks. The first check confirms that the existing keyboard driver is of legitimate and original form. The software preferably verifies the digital signature of the keyboard driver. The digital signature associates the keyboard driver with its original entity. The operating system may provide functionality for verifying that a system driver matches it's digital signature (for example, under Microsoft WINDOWS, the API: WinVerifyTrust). If the digital signature of the keyboard driver is successfully verified the program moves on. If the digital signature check fails, the software prompts the user to reinstall the keyboard driver and reboot the system.

The second check to verify keyboard driver integrity is a checksum or hash operation. A checksum, operation calculates a digit that represents the legitimate keyboard driver. The digit is calculated by adding up the total amount of bytes that comprise the driver software. If this digit changes, or if the hash changes then the keyboard driver has been changed or modified. While the software is activated it periodically performs a checksum or hash operation on the keyboard driver. The value of the very first checksum or hash operation output is stored in the operating system registry. If the output of any subsequent checksum or hash operation does not match the stored value then the keyboard driver has been modified or replaced. The software subsequently alerts the user via a pop-up window and prompts them to reboot the system.

The preferred software attempts to have exclusive control of the keyboard driver to prevent keystroke loggers from directly harvesting information. Exclusive control is ensured by being the first program that interfaces with the keyboard driver. The operating system may have a list of keyboard filter drivers stored in the system registry. The order of this list determines the loading priority of each listed driver. The preferred software checks this list upon activation. If the software filter driver according to the present invention is not at the top of the list, the order of the list is changed by the software to ensure that the software filter driver is loaded before other filter drivers. If a keystroke logging program was earlier in the driver priority list it may harvest keystrokes and mask itself from detection.

The software of the present invention is preferably designed to remain at the top of the driver priority list while it is activated and periodically verifies this is the case. If at any time another program gains priority over the keyboard driver filter the software alerts the user via a pop-up window and prompts them to reboot the system. Upon reboot the software replaces itself at the top of the driver priority list.

The software program reads the keystrokes from the keyboard driver and encrypts each character. The program stores the encrypted characters at a chosen unprotected RAM address. The preferred method of encryption uses the one-time pad technique. The encryption is performed so other programs that may read from the particular RAM address are subsequently unable to decipher the real data.

The software preferably also provides fake data to the keyboard buffer. The program generates a random character by generating a random number within a predetermined range and translating the random number to a character code. The software sends this random character to the operating system keyboard buffer in place of the real character.

The software according to the first aspect of this invention is dependant on the user having administrative rights to the operating system. Administrative rights give permission for software to be installed, and changes to be made to the system parameters of the operating system without administrative rights. Digital signature, checksum and hash checks are still able to be performed by any program. The software is therefore capable of alerting them to any keyboard driver related changes that have occurred.

Figure 1:
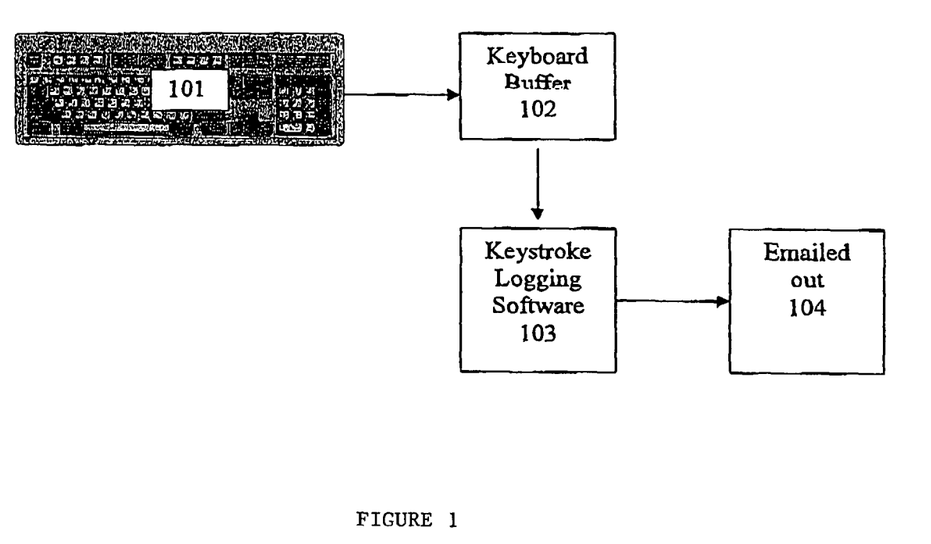
FIG. 1 is a diagrammatic representation of a system by which keystroke logging software harvests keystrokes by monitoring the keyboard buffer.

Some keystroke loggers attempt to harvest keystrokes by monitoring the keyboard buffer. These Keystroke loggers operate at an operating system shell implementation level. FIG. 1 shows a typical prior art keystroke logger of this type. The user enters characters from the keyboard 101. The keyboard driver ensures that data representing these keystrokes enter the keyboard buffer 102. The keyboard buffer acts as temporary storage for the keystrokes. Keystroke logging software 103 monitors the keyboard buffer, picking up the keystrokes entered by the user, storing this data either in memory or in a file. The keystroke logger either stores the keystrokes for later retrieval in a file on the system, or is configured to send the file via email to a pre-configured address outside the system 104.

The software according to a second aspect of the present invention works by sending fake randomly-generated characters to the keyboard buffer.

Figure 2:
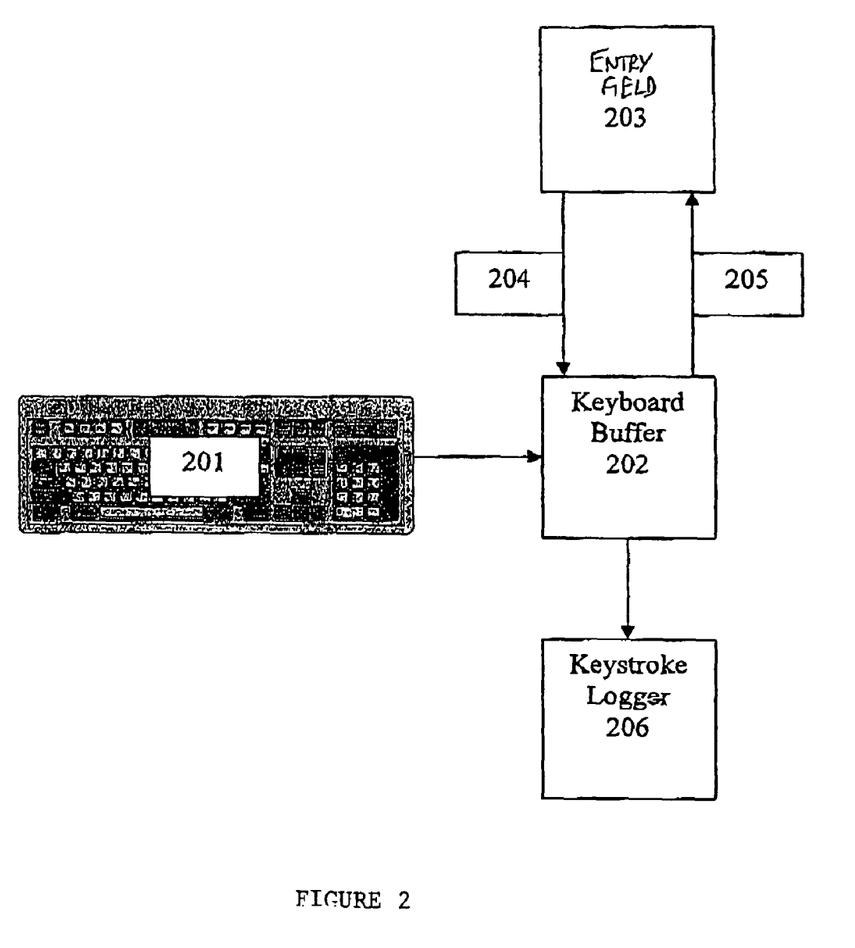
FIG. 2 is a diagrammatic representation of one aspect of the present invention which prevents keystroke loggers harvesting sensitive keystrokes by monitoring the keyboard buffer.

The keystroke logger reads all the characters from the keyboard buffer and cannot distinguish between the randomly-generated characters and those actually entered by the user. FIG. 2 illustrates this aspect of the present invention. When the field protected by the present invention has focus, the software at 203 generates a stream of random characters and sends these characters to the keyboard buffer at 204. For example with the Microsoft Windows operating system the "keybd_event" command can be used to send a character code to the keyboard buffer.

The software generates a random character by Generating a random number within a predetermined range and translating the random number to a character code. The character code is of a type that is a parameter for example for the keybd_event API. For example the character code "VK_A" represents an event associated with the "a" key. The keybd_event API selectively generates either a key-down event or a key-up event. Accordingly to represent a single key press the keybd_event command is executed once using the parameters for the particular key and indicating a key-down event and a further time with the parameter indicating the key and the parameter indicating a key-up event. To ensure a full mix of obscuring characters the software may generate simulated key presses of characters and numerals each character or numeral key press may be bracketed by a simulated press of the "shift" key to simulate an upper case character for non-excluded symbol. The random number may be generated using, for example, the Microsoft WINDOWS Crypto API.

As the user enters characters from the keyboard 201, these also enter the keyboard buffer. If a keystroke logger 206 is present it harvests all of the characters from the keystroke buffer. The keystroke logger cannot distinguish between characters sent to the keyboard buffer 202 from the keyboard 201, and those sent from the software 203 implementing the present invention.

In the preferred system, the characters sent by software 203 are streamed at random intervals. The software secures second string of random numbers in order to determine the interval. Each time interval may be for example randomly selected between 0.05 seconds and 0.5 seconds. The time interval indicates a delay between executing the relevant "keybd_event" commands. Preferably, the software executes the commands in pairs initiating the respective key-down and key-up events and includes a very short random interval between these events. This prevents a keystroke logger identifying characters originating from the keyboard by analysing the time intervals between keystrokes.

The stream of random characters generated by software 203 is generated and stored securely by the software to prevent a keystroke logger identifying the fake characters by analysing the stored memory of software 203.

After the software randomly executes a generated key-down event, the software waits until an acknowledgement from the keyboard buffer is received before sending the succeeding key-up event. This prevents losing keystroke information in the event of an overloaded keyboard buffer.

In order for the software 203 to determine the characters originating from the keyboard 201, it reads all the characters on the keyboard buffer as indicated by arrow 205, and then removes the characters sent by the software 204. Those characters remaining have originated from the keyboard 201. The software 203 may perform this analysis, for example, once focus passes from the protected entry field or on an ongoing basis. Preferably the software receives a continuous flow of data from the keyboard buffer and the flow of data is processed as it is received. As soon as either the user enters a keystroke or the software generates a false keystroke the new data in the buffer is read by the software. The software processes the new data to determine if it corresponds with the next unmatched character in the false data sequence. If the software determines that the data is not false data then it is recorded as a user entry. The protected entry field preferably displays a series of asterisks or other non-descript characters so as not to confuse the computer user.

In accordance with a further aspect of the invention this extracted data is supplied directly to the underlying application, not to the data entry window program.

Figure 3:
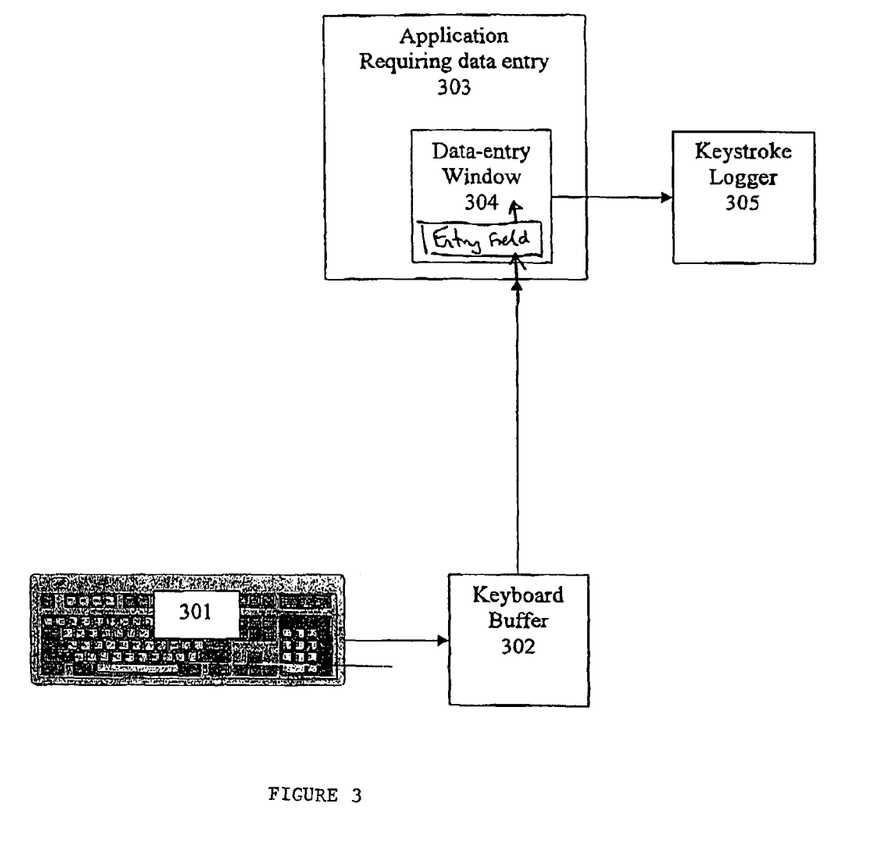
FIG. 3 is a diagrammatic representation of a system by which keystroke logging software harvests keystrokes by accessing the data entry window.

FIG. 3 illustrates a keystroke logger that harvests keystrokes from the data-entry window. The user enters data at the keyboard 301. This data enters the keyboard buffer 302. The entry field 303 reads data from the buffer 302 and sends the data to the window 304. The keystroke logger 305 monitors the data in memory associated with the data-entry window.

The protection software according to this aspect of the invention prevents keystroke loggers harvesting keyboard entry data from the data entry window memory by sending the data entry window false data, while providing the true entered data directly to the underlying application.

Figure 4:
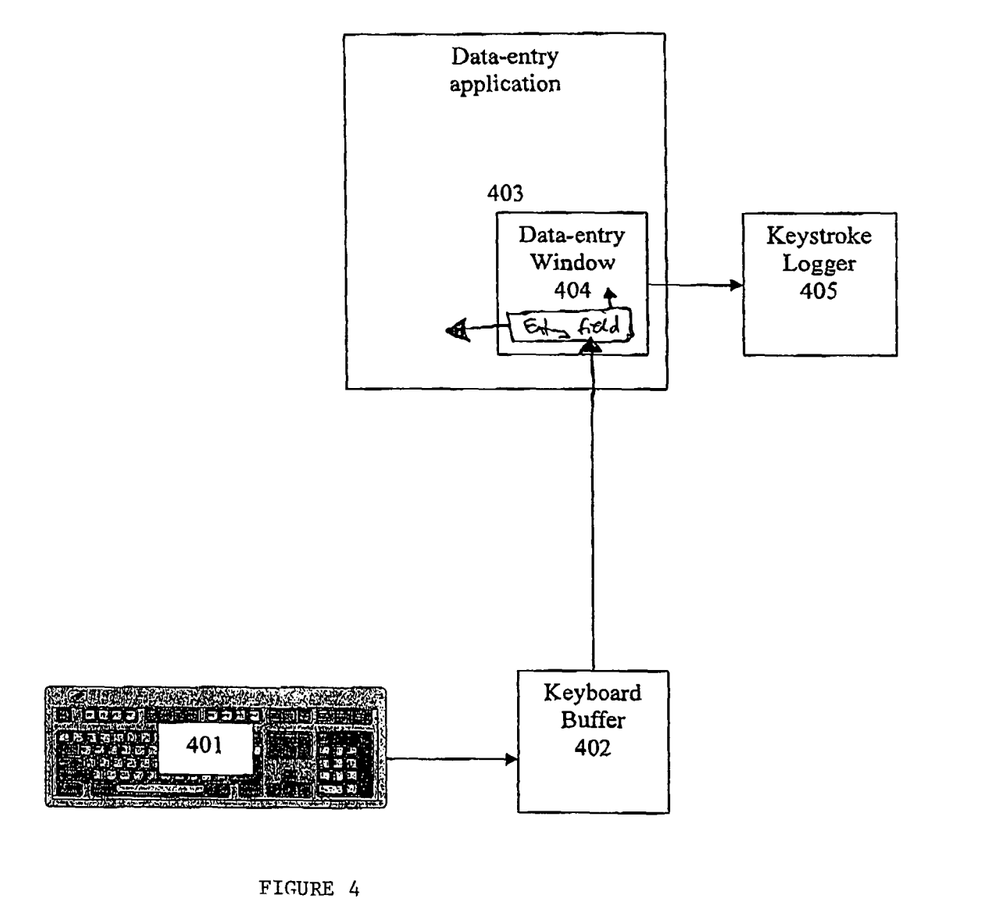
FIG. 4 is a diagrammatic representation of a further aspect of the present invention which prevents external software from accessing sensitive data from the data entry window by altering the characters held by the data entry window to randomly-generated characters.

FIG. 4 illustrates this aspect of the invention. The user enters characters at the keyboard 401. These characters enter the keyboard buffer 402. Once these characters are extracted by the modified entry field comprising the present invention 403, the entry field generates random characters and sends these random characters to the data-entry window 404. The present invention stores the actual characters entered by the user in secure memory in order that they can be processed by the underlying application software. When the application processes the data, it accesses the data securely stored by the modified entry field, not the data from the data-entry window. A keystroke logger 405 harvesting characters from the data-entry window receives the randomly generated characters and not the actual characters entered at the keyboard.

Figure 5:
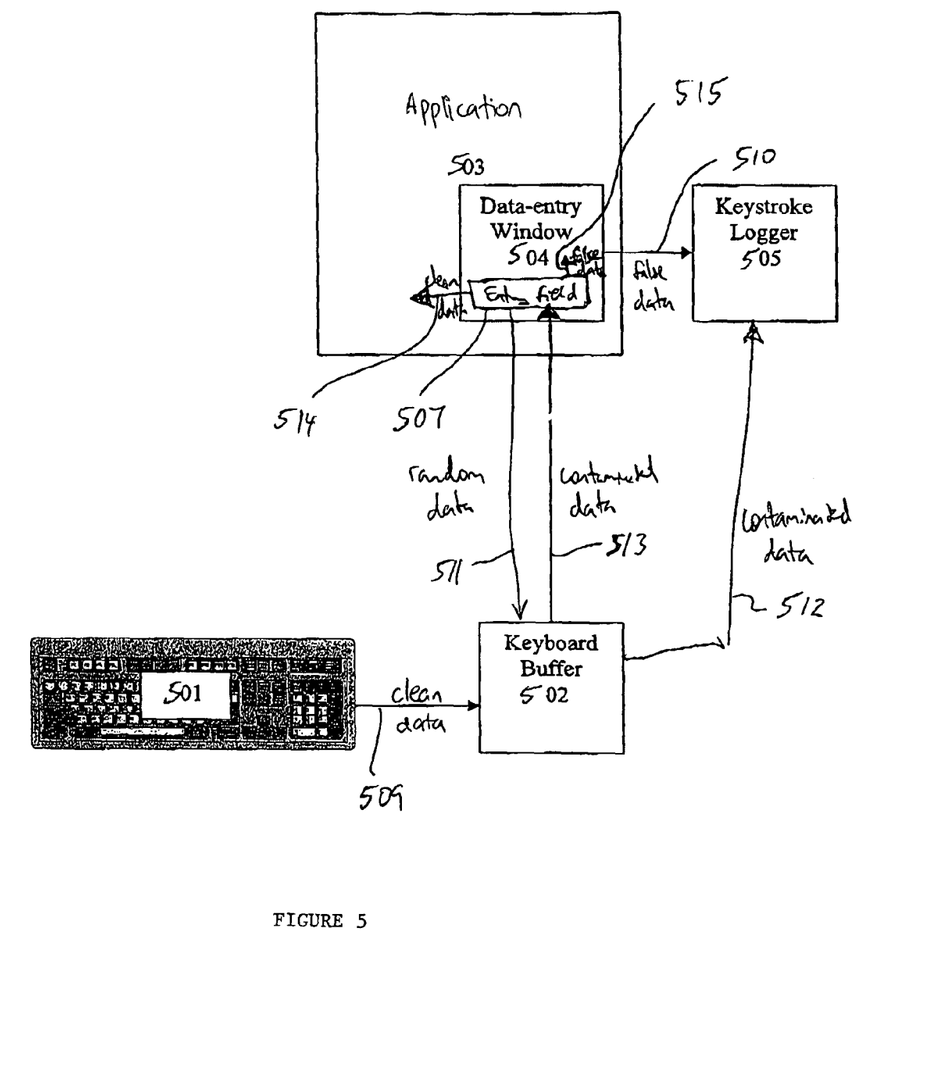
FIG. 5 is a diagrammatic representation of both aspects of the present invention working together to protect sensitive keystroke data.

For this aspect of the present invention it is important that the protected entry field supplies the unmasked user input data to the underlying application that is authorised to receive it and not to any other application which might for example be a keyboard logger. Preferably the protected entry field software element supplies the collected user input data on request from the underlying application, and the request from the underlying application is uniquely identifiable as an authorised request. In the preferred embodiment of the present invention the protected entry field supplies a randomly generated token to the underlying application that has initialised the entry field. The entry field software element reviews any request for user input data for the presence of this token, or for proof that the application making the request was the receiver of this token. The request may include the token or a derivation of the token. The protected entry field only supplies the user input data in reply to the request if the request includes the proof that the requesting application holds the token. Otherwise the preferred protected field shuts down and alerts the user to the possibility of infiltration of their system, for example by displaying a suitable message. By shutting down we mean the entry field subsequently refuses to supply user entry data, and in particular does not proceed to extract user entry data from contaminated user entry data in the case that the software includes both aspects of the present invention, such as illustrated in FIG. 5.

Preferably the protected entry field supplies the identifying token to the underlying application at the time of its initialisation. In particular preferably the initialising application requests a token from the entry field at the time of initialisation and the entry field generates a random token and supplies it in response to this request. If the entry field subsequently receives a further request for an identifying token the entry field preferably responds to this further request by shutting down and providing an alert to a user of the computer of the possible presence of an infiltrating program on their system.

Randomly generating a token may for example comprise generating a random number using the Microsoft WINDOWS Crypto API. Essentially the token is a data string of a length selected to afford suitable security.

The software according to this aspect of the invention prevents any application other than the authorised host application from accessing data entered into the modified entry field.

For non-password fields it is necessary for the user to be able to see the information they have entered into the system. For example, such fields may be credit card number or bank account fields. It is therefore not feasible to obscure the keystroke information from the window in the aforementioned manner.

In Microsoft WINDOWS operating system a window "hook" is provided by which a function can intercept events before they reach their intended application. These events can be keystrokes, mouse movements or messages. The function is subsequently capable of modifying or deleting any of these events. For example, using hooks a program can listen to all keystroke information. This is a technique commonly available to keystroke logging software.

To prevent keystroke loggers from being notified of, or being privy to keystroke information, the preferred protection software first disables all hooks in the operating system. The software then proceeds to install a master hook that monitors and filters all windows messages. The master window hook is a 'debug' hook. The debug hook is installed using the operating system API: SetWindowsHookEx. A debug hook is able to block information sent to other window hooks. Every window hook has identification pertaining to what kind of message it contains. The software of the invention uses the debug window hook to block all hooks with messages that would be of use to a keystroke logger. This prevents any other program from interfering with the information that is sent to or from a protected entry field.

The debug window hook is enabled whenever a protected input field has focus. The debug window hook is removed when the protected field loses focus again. Creating the debug window hook each time a protected input field has focus enables it to remain the master hook in the operating system.

When an application window such as a credit card field calls for keystroke information from the keyboard buffer, the master window hook installed by the software will then receive the request and allow the application window to gather the information.

When a protected field has focus and the user enters keystroke information the keyboard buffer will then request that that keystroke information be sent to the application window. The master debug window hook will receive this request and verifies the message has been sent from the underlying application. The message will then be permitted to pass to the application window. This allows the keystroke information to be visible to the user. At the same time the master window hook blocks any other requests that may interfere or log the information communicated between the keyboard buffer and application field.

The preferred software for the Microsoft WINDOWS operating system also implements some API disabling to specifically prevent keystroke loggers from using them to obtain field information. The GetWindowText and GetWindowTextEx APIs are changed from default behaviour. When these APIs are modified by the software the APIs return randomly generated fake characters in place of the real characters from the protected fields. Therefore a keystroke logger would log incorrect information if it uses either of these APIs. Other API's and events that are disabled include commands that allow keystroke loggers to capture screens.

The software also preferably goes some way toward detecting hardware keystroke loggers. Hardware keystroke loggers physically connect between the keyboard output and the socket on the computer. The USB controller of a computer knows of all the devices that are connected to the USB bus. If the computer keyboard interfaces using the USB protocol then the USB bus will include this in a list of devices. If a hardware keystroke logger is present on the physical output of a USB keyboard, the USB controller may recognise this device as separate from the keyboard. The keystroke logger should then appear in the list of devices connected to the USB bus. The preferred software upon activation scans this list for foreign devices that are possibly keystroke loggers. If the software detects a foreign device it will alert the user. The user is then able to physically investigate the existence of any unwanted devices connected to their computer keyboard.

The software preferably implements several aspects of the invention at once. An example is illustrated in the diagram of FIG. 5.

The underlying application 503 requires data from a user. The user will enter the data via keyboard 501. The data from keyboard 501 enters keyboard buffer 502. Unknown to the user of keyboard 501 a keyboard logger 505 is present in the system. The application 503 launches a data entry window 504 to gather data from the user. The data entry window 504 includes a protected entry field 507 operating in accordance with both aspects of the present invention. When the entry field 507 is initialised, application 503 requests a token. The entry field 507 generates a token and returns it to application 503.

When the entry field 507 gains focus, indicating that the user of keyboard 501 intends to enter data into the entry field 507, the entry field begins to stream random data 511 to the keyboard buffer 502. The user of keyboard 501 enters data at keyboard 501 and this clean data 509 enters keyboard buffer 502. The content of the keyboard buffer 502 is read by entry field 507 and may also be being read by a keystroke logger 505. The entry field 507 receives contaminated data 513. The keystroke logger 505 also receives contaminated data 512.

The entry field 507 generated and stored the random data stream 511 which has contaminated the clean data 509. The entry field 507 removes the random data from the contaminated data 513 that it receives from the buffer to leave clean data. Once the focus leaves the secured entry field the entry field stops streaming data to the keyboard buffer. The application 503 may request the entered data by sending a request accompanied by the token to the entry field. Clean data 514 is supplied direct to the application 503 in response to the authenticated request. False data 515 is supplied to the data entry window 504. The keystroke logger 505 may extract the false data from the data entry window as indicated by arrow 510.

Accordingly the secured entry field 507 of the present invention defeats two of the methods by which a keystroke logger 505 may attempt to extract sensitive information entered by the user of keyboard 501 while still allowing a user to supply the sensitive information to the application 503 in the usual manner. The system is essentially transparent to the user.

Further embodiments allow the software to implement the additional aspects of this invention simultaneously for both password and non-password fields.

There are various ways the software can execute on a computer system, for example, as a stand-alone software application, as part of the web browser process (such as a plug-in, extension, help object, or control of the browser), embedded within an application or as part of the computer operating system.

There are also various ways in which the software can be placed in the computer system environment, for example, downloaded from a web site, installed on the computer system or executed from an external device such as a CD-ROM or flash disk.

There are four preferred options for loading the software of the present onto a user's local computer.

The first preferred option may be used when a user loads a webpage where the entry of sensitive information is required. The webpage checks to see if the software has been preinstalled. The webpage for example may be part of an internet banking website. If the software is not already installed on the local computer the user is prompted to download and install the software. The software is not required to be downloaded again once installation has occurred. The source code defining the webpage where sensitive information is required can also contain an activation code, or the software will detect a password field. The installed software is activated when it detects an activation code contained source code of a webpage. The installed software is also activated when a password field is detected. The software is also activated by a non-password field that requires protection. The software activates the anti keystroke logging techniques when a protected field on the webpage has focus.

In the second preferred option, the software forms part of a local application running on the local device. For example the software is incorporated within a local application such as interact browsing software. When a protected field on a webpage, indicated by an activation code in the page source, has focus the software will then activate the anti keystroke logging techniques. Alternatively the software is permanently activated and does not rely on activation codes contained in the webpage.

In the third preferred option, the software is loaded from a local device such as from the personal computer hard drive, CD-ROM, or portable memory stick. Once loaded, the software can detect when an internet browsing application has been executed. The software detects when a protected field has focus on the internet browsing application. The software is then able to implement the various anti keystroke logging techniques.

In the forth preferred option, the software is embedded as part of a local application. The software is activated when the local application is executed. The software can protect data-entry fields within the application, or alternatively data-entry fields external to the application or on web-based applications.

While this anti-keystroke logging software has been developed using the Microsoft Windows operating system on a personal computer, the software employs concepts that are extendable to other devices and operating systems. Devices such as cellular phones and PDA's all have a form of keyboard buffer that functions in a similar way to a common computer. Thus the buffer streaming technique is able to be implemented.

Other devices also have keyboard or keypad drivers and data-entry windows and/or fields, allowing key entry to be replaced with fake characters. The techniques described in this document can therefore be applied to sensitive data fields on a range of hardware devices.

I claim:

1. A method for securing user entry data for a computer that is entered via a keyboard, the method comprising:
   receiving user input data via a keyboard, the user input data representing keyboard keystrokes,
   masking the user input data,
   receiving a request for user input data,
   identifying a valid requesting application in said request, and
   returning unmasked user input data to an identified valid requesting application wherein said step of masking user input data comprises the steps:
   determining that an entry field subject to protection has focus for user input data entry; while said field has focus, collecting said user input data using a kernel-level filter and storing the user input data without sending the user input data to a keyboard buffer, and
   for each keyboard keystroke represented in the user input data, sending to the keyboard buffer a randomly generated pseudo-entry replacement keystroke in place of said keyboard keystroke represented in said user input data.

2. The method as claimed in claim 1, further comprising encrypting said stored user input data.

3. The method as claimed in claim 1 wherein the method is implemented under the Microsoft WINDOWS operating system and the method implementing itself as a keyboard driver having highest priority in said system, at least for the duration that a protected entry field has focus.

4. The method as claimed in claim 3, further comprising periodically checking that the keyboard driver still has the highest priority for the duration that the protected entry field has focus.

5. A method for securing user entry data for a computer that is entered via a keyboard, said method comprising:
   receiving user input data via a keyboard, the data representing keyboard keystrokes,
   masking user input data,
   receiving a request for user input data,
   identifying a valid requesting application in said request,
   returning unmasked user input data to an identified valid requesting application, wherein at the time of initialization the computer program executes the steps of:
   receiving a request for a token from an application,
   returning a unique token to said application in response to said request;
   identifying a valid requesting application in a said request for user input data on the basis of the request exhibiting proof of possession of said unique token by said application, and
   switching to a disabled mode, wherein a warning is presented to the user and all subsequent input to the field is ignored, if a second token is requested.

6. A method for securing user entry data for a computer that is entered via a keyboard, the method comprising: determining that an entry field subject to protection has focus for user data entry; while said field has focus, collecting said user entry data using a kernel-level filter and storing the user entry data without sending the user entry data to a keyboard buffer, the user entry data representing keyboard keystrokes, and for each keyboard keystroke, generating a replacement keystroke for passing to the keyboard buffer.

7. The method as claimed in claim 6, further comprising encrypting said stored user entry data.

8. A system for preventing keyboard sniffer programs from intercepting input keystrokes via a keyboard comprising:
a keyboard driver adapted to interface with a keyboard,
a keyboard buffer for receiving and storing keystrokes, and
a kernel-level filter interfaced with the keyboard driver and keyboard buffer, the kernel-level filter being adapted to receive input keystrokes from the keyboard driver and prevent them from reaching the keyboard buffer, and in response to each keystroke received at the keyboard driver, generate a random replacement keystroke for passing to the keyboard buffer.

9. The system according to claim 8 wherein the kernel-level filter is implemented on an operating system and the kernel-level filter is implemented as highest priority.

10. The system according to claim 9 wherein the kernel-level filter periodically checks that the kernel-level filter is implemented as highest priority.

11. A method for preventing keyboard sniffer programs from intercepting input keystrokes via a keyboard comprising:
receiving at a kernel-level filter input keystrokes from a kernel-level keyboard driver, the input keystrokes from the keyboard driver being received from a keyboard,
preventing the input keystrokes from being passed to a keyboard buffer, and
in response to receiving each input keystroke generating a random replacement keystroke for passing to the keyboard buffer, and
providing the received input keystrokes for use by a software application.

12. The method according to claim 11 wherein the method is implemented on an operating system and the kernel-level filter is implemented as highest priority.

13. The method according to claim 12 further comprising periodically checking that the kernel-level filter is implemented as highest priority.

14. A system for preventing keyboard sniffer programs from intercepting input keystrokes via a keyboard comprising:
a keyboard,
a keyboard driver coupled to the keyboard to receive data representing keystrokes made on the keyboard,
a keyboard buffer for receiving and storing data representing keystrokes, and
a kernel-level filter interfaced with the keyboard driver and keyboard buffer, the kernel-level filter being adapted to receive data received at the keyboard driver and prevent the data from reaching the keyboard buffer, and in response to receiving data at the keyboard driver representing keystrokes, generate for each keystroke a random replacement keystroke for passing to the keyboard buffer.

15. A method for preventing keyboard sniffer programs from intercepting input keystrokes via a keyboard comprising:
receiving input keystrokes on a keyboard, input data representing the keystrokes made being received at a kernel-level driver,
receiving at a kernel-level filter input data representing keystrokes from a kernel-level keyboard driver, the keystrokes being entered on a keyboard,
preventing the input data from being passed to a keyboard buffer, and
in response to receiving each input keystroke, generating data representing a random replacement keystroke for passing to the keyboard buffer, and
providing the input data representing keystrokes to a software application.

16. The method according to claim 15 wherein providing the input data for use by a software application comprises storing the input data in memory, and the method further comprises retrieving the input data from the memory for use by the software application.

17. The method according to claim 16 comprising encrypting the input data for storing in encrypted form.

18. The method according to claim 15 wherein the method is implemented on an operating system and the kernel-level filter is implemented as highest priority.

19. A method for securing user entry data for a computer that is entered via a keyboard, the method comprising:
receiving user input data via a keyboard, the user input data representing keyboard keystrokes,
masking the user input data,
receiving a request for user input data,
identifying a valid requesting application in said request, and
returning unmasked user input data to an identified valid requesting application, wherein said step of masking user input data comprises the steps:
determining that an entry field subject to protection has focus for user input data entry; while said field has focus, collecting said user input data using a kernel-level filter and storing the user input data without sending the user input data to a keyboard buffer, and
for each keyboard keystroke represented in the user input data, sending to the keyboard buffer two or more randomly generated pseudo-entry replacement keystrokes in place of said keyboard keystroke represented in said user input data.

20. A system for preventing keyboard sniffer programs from intercepting input keystrokes via a keyboard comprising:
a keyboard driver adapted to interface with a keyboard,
a keyboard buffer for receiving and storing keystrokes, and
a kernel-level filter interfaced with the keyboard driver and keyboard buffer, the kernel-level filter being adapted to receive input keystrokes from the keyboard driver and prevent them from reaching the keyboard buffer, and in response to each keystroke received at the keyboard driver, generate two or more random replacement keystrokes for passing to the keyboard buffer.

21. A method for preventing keyboard sniffer programs from intercepting input keystrokes via a keyboard comprising:
receiving at a kernel-level filter input keystrokes from a kernel-level keyboard driver, the input keystrokes from the keyboard driver being received from a keyboard,
preventing the input keystrokes from being passed to a keyboard buffer, and
in response to receiving each input keystroke generating two or more random replacement keystrokes for passing to the keyboard buffer, and
providing the received input keystrokes for use by a software application.

* * * * *